April 2, 1940.  S. A. HUFFMAN ET AL  2,195,533
SHEET DELIVERY MECHANISM
Filed May 13, 1938   7 Sheets-Sheet 2

INVENTORS
Samuel A. Huffman,
Joseph Sinkovitz
and August A. Saul
by their attorneys
Stebbins, Blenko & Parmelee April 2, 1940.  S. A. HUFFMAN ET AL  2,195,533
SHEET DELIVERY MECHANISM
Filed May 13, 1938  7 Sheets-Sheet 4

INVENTORS
Samuel A. Huffman,
Joseph Sinkovitz
and August A. Saul
by their attorneys
Stebbins, Blenko & Parmelee

April 2, 1940.  S. A. HUFFMAN ET AL  2,195,533
SHEET DELIVERY MECHANISM
Filed May 13, 1938  7 Sheets-Sheet 6

INVENTORS
Samuel A. Huffman,
Joseph Sinkovitz
and August A. Saul

April 2, 1940.                  S. A. HUFFMAN ET AL                    2,195,533
                                SHEET DELIVERY MECHANISM
                                Filed May 13, 1938            7 Sheets-Sheet 7

INVENTORS
Samuel A. Huffman,
Joseph Sinkovitz
and August A. Saul

Patented Apr. 2, 1940

2,195,533

UNITED STATES PATENT OFFICE 2,195,533

SHEET DELIVERY MECHANISM

Samuel A. Huffman, Joseph Sinkovitz, and August A. Saul, Pittsburgh, Pa.

Application May 13, 1938, Serial No. 207,734

12 Claims. (Cl. 271—64)

This invention relates to sheet handling apparatus and, in particular, to a mechanism for delivering and piling sheets discharged singly by any type of processing machine. The invention relates specifically to an apparatus for delivering and piling sheets discharged from a press arranged to perform cutting and creasing operations thereon.

In cutting and creasing operations, certain portions of the sheet are sheared completely through, making it practically impossible to deliver them by the mechanisms usually employed for delivering sheets after such processing operations as printing wherein no shearing is effected. Sheets which have been cut and creased require to be supported throughout substantially their entire area. While various types of pile delivery mechanisms for sheets which have been cut and creased have been proposed heretofore, they have all, so far as we are aware, been characterized by a common difficulty or objectionable feature, viz., the fact that the press on which the cutting and creasing is effected must be stopped periodically in order to remove a pile of sheets accumulating at the discharge end of delivery. This difficulty, while similar to that experienced in printing operations, is even more pronounced in cutting and creasing because the stock employed is usually of substantial thickness so that the pile builds up very rapidly. In a specific machine, for example, the pile support is fully loaded after fifteen minutes' operation. It will be recognized that stoppage of the machine for pile removal every fifteen minutes imposes a severe limitation upon the production obtainable.

Delivery mechanisms which do not dispose the cut and creased sheets in a pile do not require stopping of the press but are little used because of other objections.

We have invented a pile delivery mechanism specially adapted for sheets which have been subjected to cutting and creasing operations, which satisfies the requirement first mentioned, viz., support for the sheets substantially throughout its entire area, and furthermore, makes it unnecessary to stop the press to unload or remove an accumulated pile. In accordance with our invention we provide a delivery capable of discharging sheets on a selected one of a plurality of pile supports. We are thus able to remove a pile from one support while the press continues to deliver sheets to another support. We also provide means whereby the delivery of sheets may be shifted from one pile support to another without stopping the machine so that, barring accidents, the press may be run continuously, as long as necessary to complete the job in hand. In a preferred form of the invention, we provide a relatively fixed conveyor adapted to receive sheets as discharged from the press. Reciprocating conveyors arranged in tandem are so disposed relative to the fixed conveyor that one of them cooperates with the latter and is adapted to receive sheets successively therefrom. Between the reciprocating conveyors we provide deflecting means whereby a sheet received by the first reciprocating conveyor may be directed selectively to the second conveyor or immediately to a pile support. If the sheet is delivered to the second conveyor, it is discharged therefrom onto a pile support.

The details of our invention will be described and explained fully herebelow with reference to the accompanying drawings illustrating a preferred embodiment with a modification of certain features. In the drawings:

Fig. 8 is a partial sectional view taken along the line VIII—VIII of Fig. 2a;

Fig. 11 is a partial plan view to enlarged scale of certain features shown also in Fig. 2a.

Referring now in detail to the drawings, the apparatus of our invention is mounted on spaced side frames 10 and 11 disposed substantially in alinement with and, in effect, constituting continuations of the side frames 13 of a press adapted for cutting and creasing operations. The press includes a cylinder 14 journaled in suitable bearings and a reciprocating bed (not shown) cooperating therewith and provided with cutting and creasing dies. The details of the construction and operation of the press are well known so require no further explanation. The side frames 10 and 11 have feet 15 resting on the side frames 13 and are secured thereto by bolted brackets 16. The side frames 10 and 11 are each made in two pieces bolted together, the joint between sections being shown at 17. The sections of the side frames most remote from the press are provided with supporting legs 18 adapted to engage the foundation or floor 19 on which the side frames 13 are positioned.

Brackets 21 mounted on the side frames 10 and 11 at the press end thereof support a transverse shaft 22 in suitable bearings. Brackets 23 extend inwardly from the side frames 10 and 11 and are provided with bearings in which are disposed a shaft 24. The shafts 22 and 24 are provided with pulleys about which are trained tapes 25 constituting a continuous belt conveyor for receiving sheets delivered from the press cylinder 14 across strippers 26. The tapes 25 also extend around a tightener 25a. The shaft 22 is driven by a chain and sprocket drive 27 from the cylinder 14.

Figure 1:
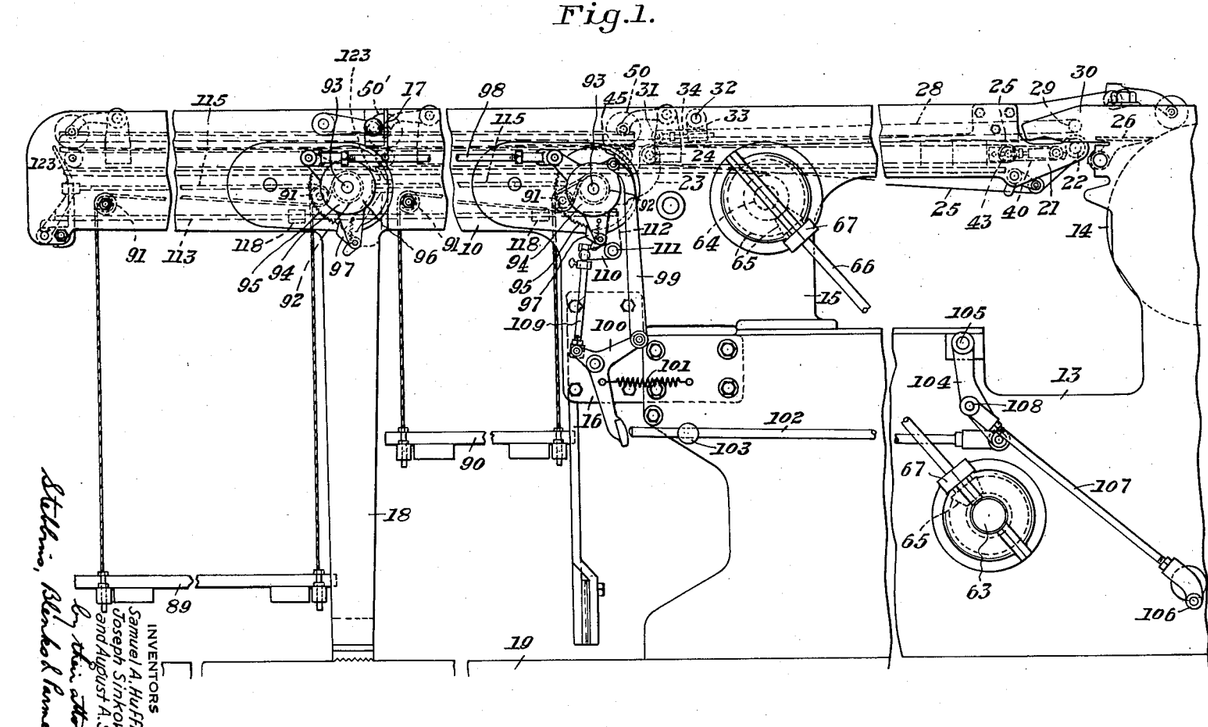
Fig. 1 is a side elevation partly broken away.
Figure 2A:
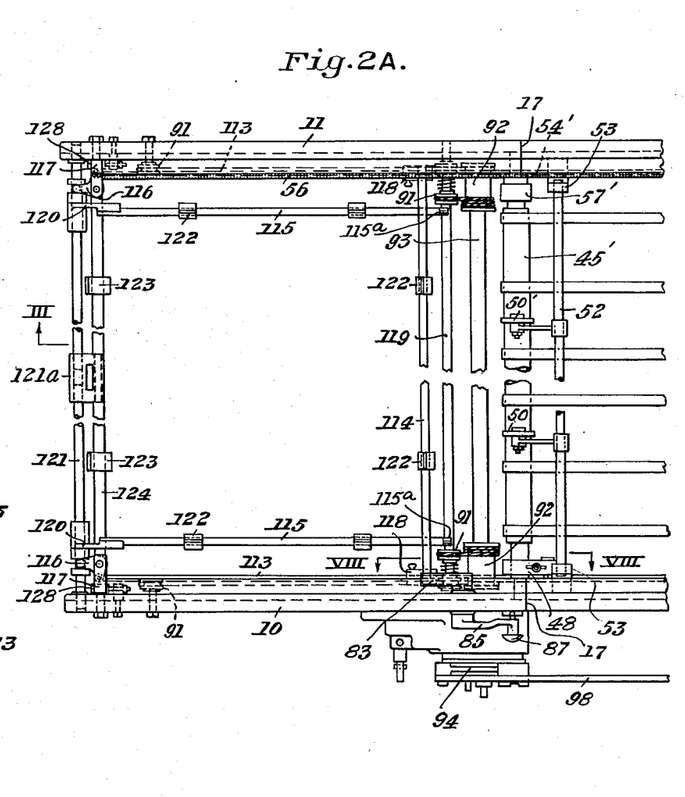
Figs. 2a and 2b, when disposed side by side with the former on the left, constitute a plan view with parts omitted for clearness.
Figure 2B:
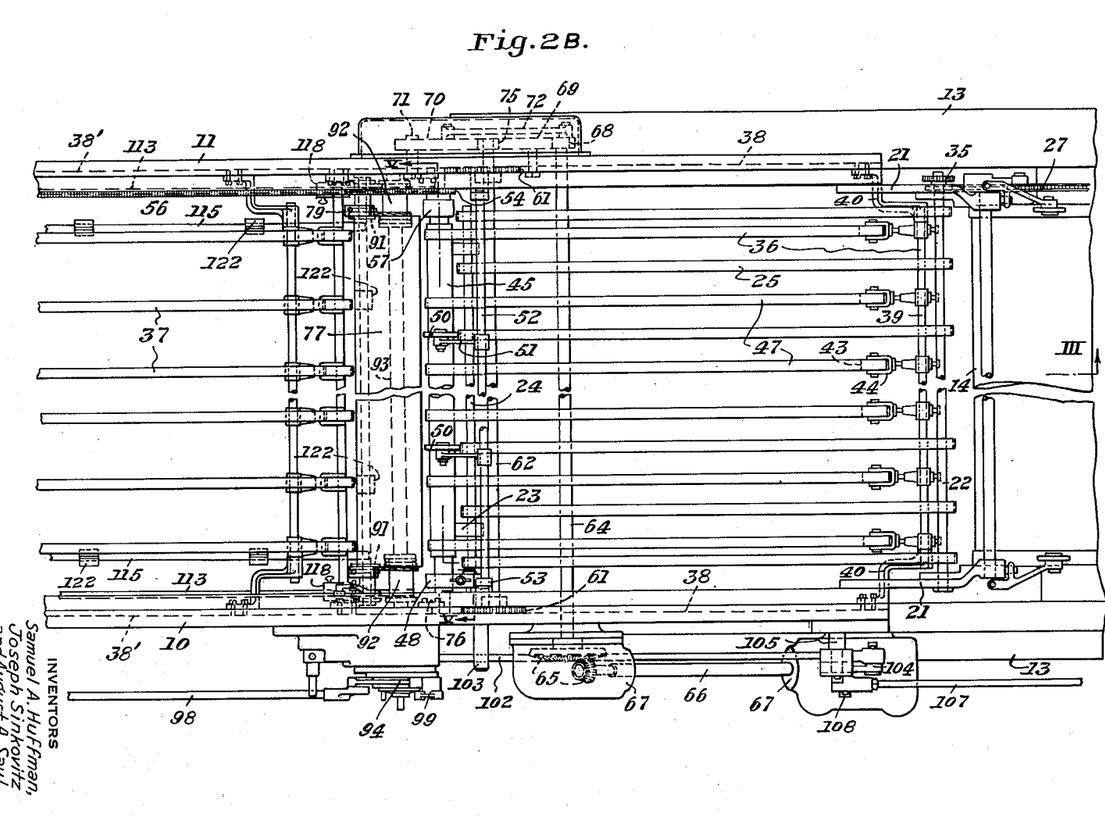

Cooperating with the tapes 25 are top tapes 28 (see Fig. 1). The tapes 28 are trained around a shaft 29 journaled in bearings formed in portions of brackets 21. These portions, as well as the tapes 28, are omitted from Figs. 2a and 2b for the sake of clearness. The tapes 28 are also trained around pulleys 31. These pulleys are supported on a cross rod 32 fixed at its ends in side frames 10 and 11, by means of brackets 33 and fingers 34. The shaft 29 is provided with a gear meshing with a gear 35 on shaft 22. By this means, the tapes 25 and 28 are driven at the same speed so long as the press cylinder rotates.

Figure 3A:
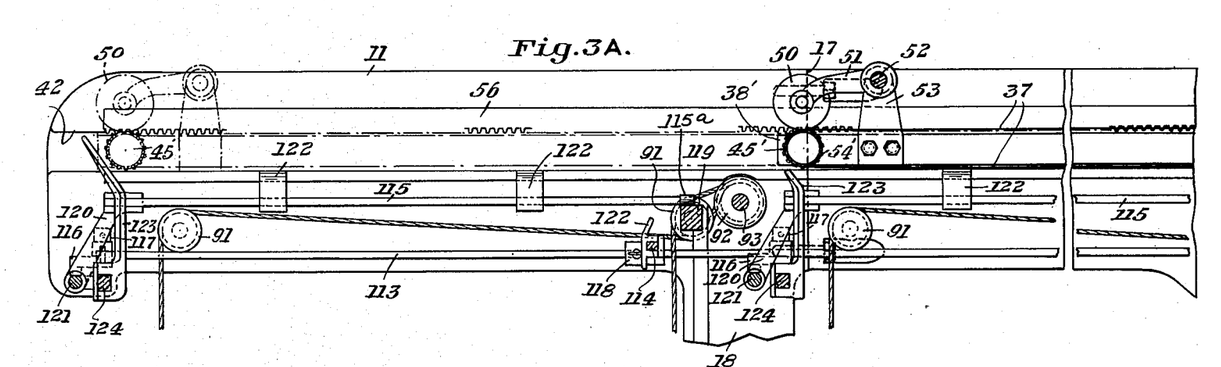
Figs. 3a and 3b similarly constitute a central longitudinal section taken along the line III—III of Figs. 2a and 2b.
Figure 3B:
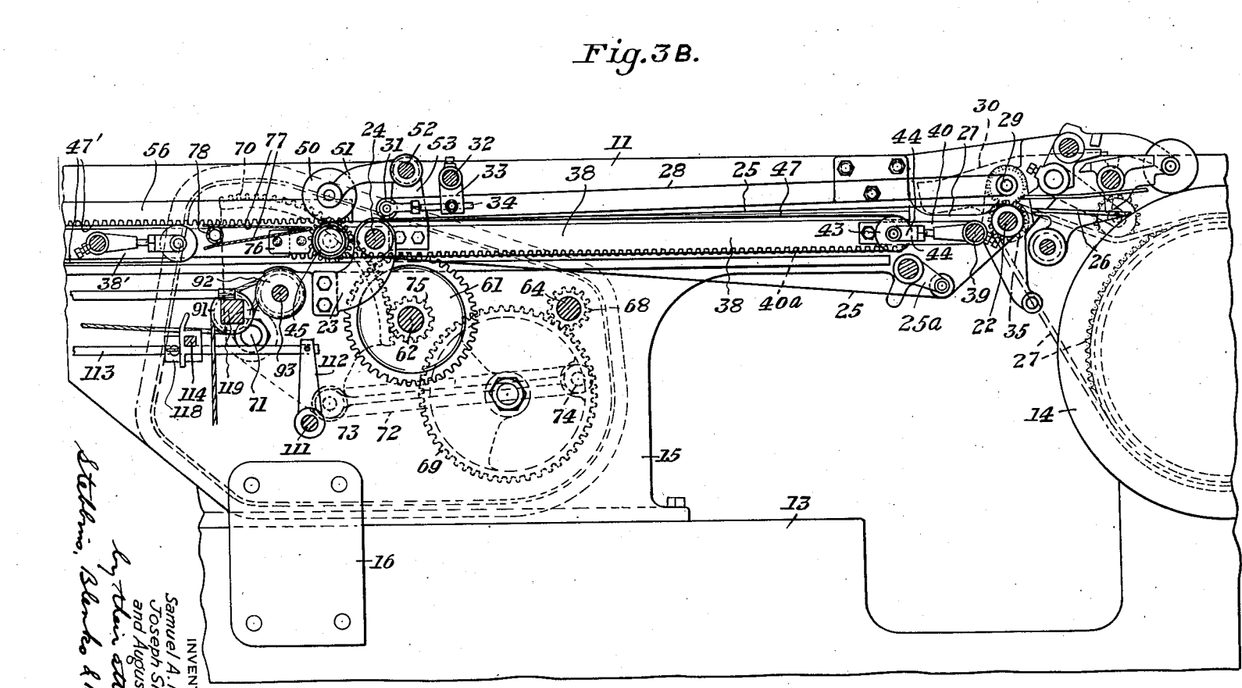
Figure 4:
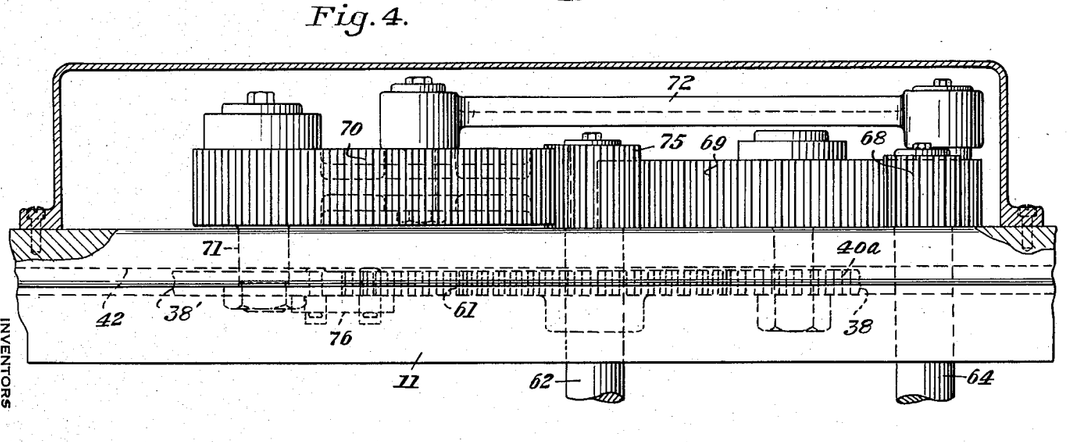
Fig. 4 is a plan view to enlarged scale of a portion of the mechanism shown in Fig. 2b, partly in section.
Figures 5, 6, 7:
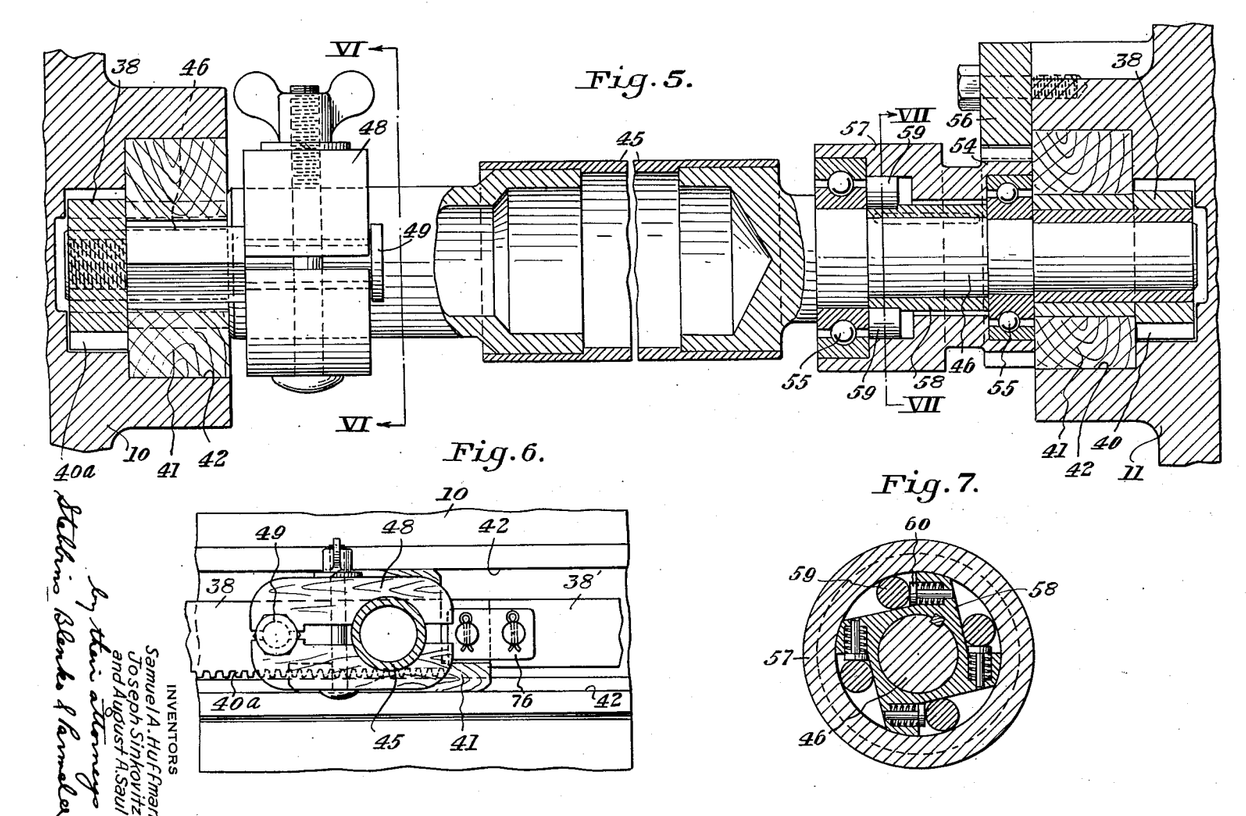
Fig. 5 is a sectional view partly broken away taken along the line V—V of Fig. 2b.
Figs. 6 and 7 are sectional views taken along the lines VI—VI and VII—VII respectively of Fig. 5.

Reciprocating conveyors indicated generally at 36 and 37 cooperate with the fixed conveyor already described. As best shown in Figs. 3b and 5, the conveyor 36 comprises a frame including side bars 38 and a cross rod 39 secured to brackets 40 extending inwardly from the bars 38. The side bars 38 have rack teeth 40a formed thereon and are supported on slide blocks 41 secured thereto and adapted to travel along ways 42 formed on the inside faces of the side frames 10 and 11. Pulleys 43 are journaled in yokes 44 which are secured to the rod 39. A driving pulley 45 has trunnions 46 journaled in the bars 38. Tapes 47 are trained around the pulleys 43 and 45. As shown best in Fig. 3b, the tapes 47 lie below the tapes 25 when the conveyor 36 is in the position there shown. It will also be noted that the tapes 47 are interposed between the tapes 25. The conveyor 36, therefore, is substantially co-extensive with the fixed conveyor in the position shown in Figs. 2b and 3b.

A friction brake 48 engages one end of the pulley 45, being mounted on a pin 49 extending inwardly from the adjacent side bar 38. This brake holds the drive pulley 45 against rotation when the conveyor 36 is moved away from the press cylinder 14 by means which will be described shortly. Gripper disks 50 are journaled on arms 51 secured to a cross rod 52. The cross rod is mounted on brackets 53 extending inwardly and upwardly from the side bars 38. The gripper disks 50 bear on the pulley 45. Their function is to stop a sheet fed forward onto the conveyor 36 from the fixed conveyor as the former moves away from the press cylinder.

As stated, the brake 48 holds the pulley 45 against rotation on outward movement of the conveyor 36. The pulley 45 is driven, however, on return movement of the conveyor, in such direction as to hold the sheet stationary while the conveyor travels out from under it, since the upper runs of the conveyor tapes 47 move, relative to the conveyor 36, at a speed equal to but in a direction opposite that of the conveyor 36. The upper runs of the tape 47 thus remain stationary relative to the side frames 10 and 11. This is accomplished by a pinion 54 journaled on bearings 55 on the right hand trunnion 46 of the pulley 45 as viewed in Fig. 5. The pinion 54 meshes with a rack bar 56 secured to the inner face of the side frame 11. A clutch cylinder 57 is formed integral with the pinion 54. A wedging clutch member 58 is keyed to the right hand trunnion 46. Pins 59 disposed between the wedging member 58 and the interior of the clutch cylinder 57 cooperate therewith under the influence of spring pressed plungers 60 to constitute a clutch effective to drive the pulley 45 only on return movement of the conveyor 36. As a result, a sheet which has been deposited on the conveyor 36 with its leading edge between the gripper disks 50 and the pulley 45 is advanced with the conveyor to the limit of its outward movement. On reversal of the conveyor, the sheet remains stationary in space and the conveyor rolls out from under it, the tapes 47 being driven by the rack and pinion drive and free-wheeling clutch so that their upper runs move to the left, relative to the conveyor 36, as viewed in Fig. 2b at a speed which is the same as that at which the conveyor is returned to the position illustrated in Figs. 2b and 3b. As above explained, the upper runs are stationary relative to a fixed point.

The conveyor 36 is traversed back and forth by means of gears 61 mounted on a cross shaft 62 and meshing with the rack teeth 40a formed on the side bars 38. The shaft 62 is oscillated in timed relation with the operation of the press by means which will now be described.

A shaft 63 is driven at a speed proportionate to that at which the press is operated by any convenient drive. In the embodiment shown, the shaft 63 happens to be the fly-wheel shaft of the press. The shaft 63 drives a cross shaft 64 by means of bevel gear drives 65 and an inclined shaft 66 journaled in bearings 67 on the side frame 10 and the adjacent side frame 13. A pinion 68 on the shaft 64 meshes with a gear 69 journaled on a shaft fixed in the side frame 11. A gear segment 70 is pivoted on the side frame 11 at 71 for oscillation and is connected to the gear 69 by a link 72 pivoted to the segment at 73 and to the gear at 74. Rotation of the gear 69 obviously causes oscillation of the segment 70. The latter meshes with a pinion 75 keyed to the shaft 62 and thereby oscillates the latter to cause reciprocation of the conveyor 36 through the gears 61 and rack teeth 40a.

The conveyor 37 is almost identical with the conveyor 36 except that the side bars 38' thereof do not have rack teeth formed thereon. They are, however, connected to the side bars 38 by links 76. As a result, the conveyors 36 and 37 reciprocate as a unit. Since the structure of the two conveyors is nearly identical, a detailed description of the conveyor 37 is unnecessary.

A deflector member 77 (see Figs. 2b, 3b, 8 and 9) in the form of a sheet bent back on itself to provide a sharp edge is mounted on a cross shaft 78 journaled in the side bars 38' of the conveyor 37. The deflector member is movable from the position shown in solid lines to the position shown in dotted lines in Fig. 8. It is normally held in one or the other of these positions by a friction brake 79 similar to that shown at 48 mounted on a pin 80 extending inwardly from one of the side bars 38'. A lever 81 is secured to the shaft 78 adjacent the side frame 10 and is provided with a follower roller 82 adapted to cooperate with a side cam 83. The side cam 83 is secured to a shaft 84 journaled in the side frame 10 and provided with an operating lever 85. A spring pressed plunger 86 in a handle 87 on the lever 85 cooperates with holes 88 in a plate on the side frame 10 to hold the cam 83 in one of its two extreme positions indicated in solid and dotted lines in Fig. 8. The pin 80 also serves as a stop pin for the lever 81, by cooperating with the sides of a notch 81a therein.

Figure 8:
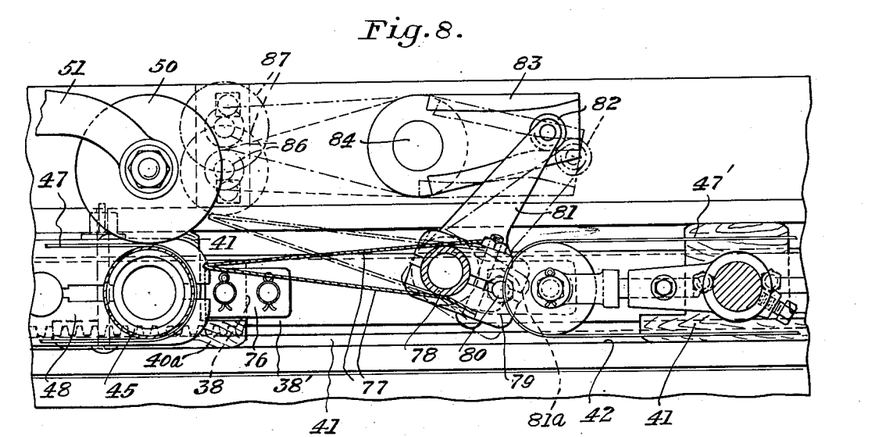
Figure 9:
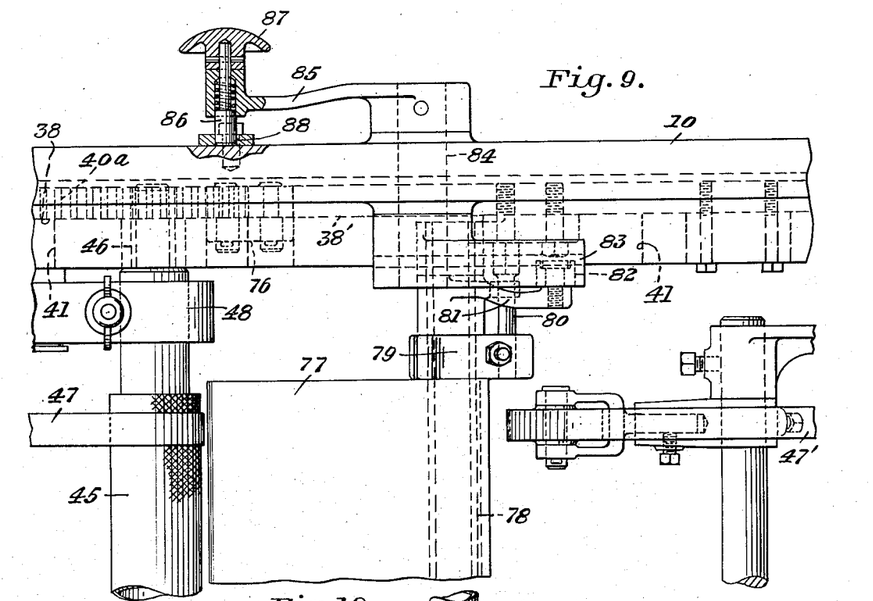
Fig. 9 is a partial plan view showing the elements illustrated in Fig. 8.

It will be apparent that if the deflector member 77 is in the position illustrated in solid lines in Fig. 8 and the cam 83 is shifted to the position thereof shown in dotted lines, the follower 82 will engage the upper surface of the cam 83 on the next succeeding reciprocation of the conveyors 36 and 37 to tilt the member 77 to its dotted line position. The reverse operation may be effected by restoring the cam 83 to its solid line position. The side cam 83 and its adjusting lever 85 thus constitute means for shifting the deflector 77 to one of its extremes or the other without stopping operation of the press or delivery mechanism.

When the deflector member 77 is in the position in which it is illustrated in solid lines in Fig. 8, reverse movement of the conveyors 36 and 37, viz., toward the press, causes the sheet to be transferred from the conveyor 36 to the conveyor 37. This results because, as already stated, the sheet remains stationary in space while the conveyor 36 rolls out from under it and the conveyor 37 rolls under it. The tapes 47' of the conveyor 37 are driven in precisely the same manner as the tapes 47 of the conveyor 36. In this connection it may be noted that the rack bar 56, as shown in Figs. 3a and 3b, extends the full length of the side frames. After transfer from the conveyor 36 to the conveyor 37 on return movement thereof, the sheet is then again moved on the second outward trip of the conveyors to a position over a pile support 89 and on the second return movement of the conveyors, the sheet falls downwardly onto the pile as the conveyor 37 rolls out from under it.

When the deflector member 77 is in the position illustrated in dotted lines in Fig. 8 a sheet on the conveyor 36, instead of being transferred to the conveyor 37 on return movement of the conveyors, is deflected downwardly from the tapes 47 onto a pile carried on a pile support 90.

The pile supports 89 and 90 are suspended on cables traversing pulleys 91 mounted on the side frames 10 and 11. The cables are secured to drums 92 on shafts 93. The mechanisms for operating these shafts are indicated generally at 94 and each comprises a ratchet-wheel 95, a reciprocating disk 96 and a pawl 97 carried thereby cooperating with the ratchet-wheel. This mechanism is disclosed in detail and claimed in an application Serial No. 144,607 filed May 25, 1937 for Pile raising and lowering mechanism by Joseph Sinkovitz. It will be sufficient here, therefore, to state simply that oscillation of the disks 96 causes gradual lowering of the pile supports 89 and 90 as the piles of sheets build up thereon. The disks 96 of the two pile lowering mechanisms are connected by a link 98 pivoted to suitable projections extending radially from the disks. The disk nearer the press is operated by a link 99 pivoted thereto and to one leg of a bell crank 100 pivoted on a shaft extending from the side frame 10. The bell crank has a restoring spring 101 and is actuated by a push rod 102 sliding in a suitable bearing 103. The push rod is pivoted to a lever 104 which in turn is pivoted at 105 to the side frame 13. The lever 104 is swung back and forth by a crank 106 and a pitman 107 pivoted to the lever 104 at 108. The crank 106 is carried on a shaft which is driven at a speed proportionate to that at which the press operates.

The bell crank 100, in addition to the legs with which the links 99 and 102 cooperate, has a short leg to which is pivoted the link 109. This link is also pivoted to a crank 110 on a cross shaft 111. Cranks 112 on this shaft operate push rods 113 for actuating jogger bars 114 directly. The push rods 113 also actuate jogger bars 115 indirectly through bell cranks 116 mounted on bearing posts 117 projecting inwardly from the side frames 10 and 11. The jogger bars 114 are carried on the push rods 113 by sleeves 118 adjustable along the latter. The ends of the jogger bars 115 nearer the press are provided with rollers 115a bearing on a cross bar 119. The other ends of these jogger bars are supported by brackets 120 secured to portions of a transverse shaft 121 slidably mounted in the side frames 10 and 11 and a central bearing block 121a. The bell cranks 116 actuate the opposite ends of the shaft 121 toward and away from each other thus causing the jogger bars 115 to execute similar movements. The several jogger bars are provided with guides 122. Rear guides 123 are mounted on cross bars 124 journaled in the side frames 10 and 11 and the blocks 121a. The cross bars 124 are normally urged clockwise by springs 125, one end of which engages under a pin carried on a stud 126, the other end of each spring being anchored to a pin 127 extending through the cross bar 124. A dog 128 having a square recess to receive the cross bar 124 is held thereon by a screw 129 and a washer thereunder. The dog 128 has a projection 130 adapted to engage an adjustable stop screw 131 threaded through the stud 126. The guides 123 may thus be pulled back to permit a bunch of sheets to be lifted off the pile on the support 89. Sheets may similarly be lifted from the pile on the support 90 in case the conveyor 37 and pile support 89 are not used. It will be understood that the jogger mechanism shown in Fig. 2a for the support 89 is duplicated for the support 90, although a detailed showing of the duplicate jogger mechanism has not been included in the drawings.

Figure 10:
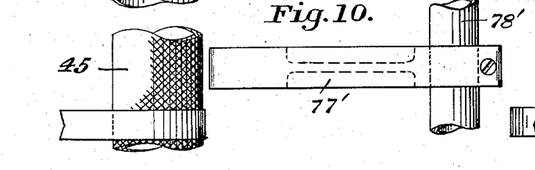
Fig. 10 is a partial plan view showing a modification of a feature shown in Figs. 8 and 9.
Figure 11:
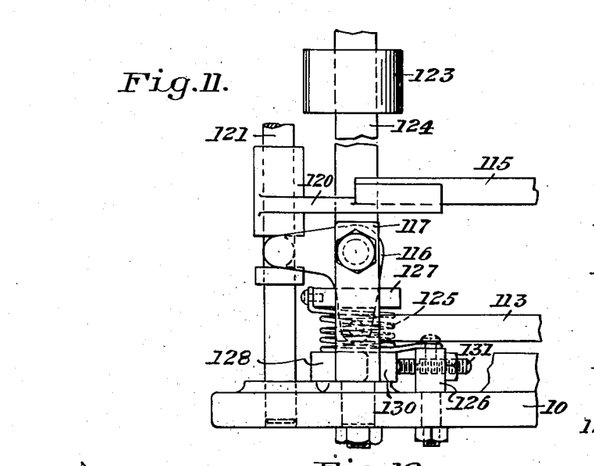
Figure 12:
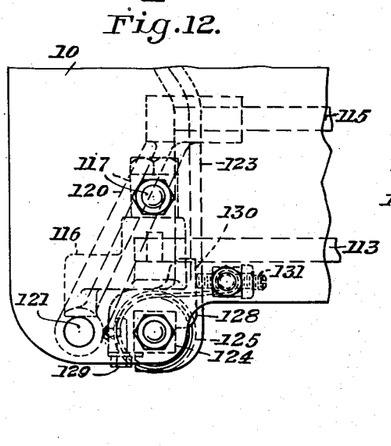
Fig. 12 is a side elevation of the parts shown in Fig. 11.

A modified form of deflector member 77' is shown in Fig. 10. According to this modification, the deflector is constituted by a plurality of separate fingers secured to a shaft 78' instead of by a continuous sheet folded back on itself. The fingers are V-shaped in side elevation in about the same manner as the deflector plates 77.

It will be apparent from the foregoing description and explanation that the invention provides a means for delivering sheets to any selected one of a plurality of piles as well as means for readily shifting the delivery from one pile to another whereby any pile may be unloaded without stopping the delivery of sheets. The construction of the conveyors is sturdy yet light enough to permit operation thereof at high speeds without objectionable shock or vibration. The tapes of the tandem conveyors are positively held against movement of the outward stroke of the conveyors and are positively driven on the return stroke leaving the sheets stationary in space for delivery to the next conveyor or to a pile support. Since the conveyor 36 is substantially co-extensive with the fixed conveyor when the former is retracted, the sheet is fully supported throughout substantially its entire area at all times. In the operation of the apparatus, sheets discharged from the cylinder are advanced by the tapes 25 of the fixed conveyor while the conveyor 36 is approaching the cylinder and retreating therefrom. The leading edge of the sheet quickly overtakes the conveyor 36 and is engaged by the gripper disks 50 when the conveyor 36 has moved a short distance from its extreme position adjacent the cylinder. At that instant, the speed of the conveyor is only slightly less that that of the sheet. Thereafter the sheet moves with the conveyor 36 and away from the fixed conveyor.

One of the numerous advantages of the invention is the fact that the second conveyor and pile support may be left off if not needed. In such event the rear sections of the side frames are removed by unbolting at the joint 17. The connecting links 76 between the conveyors are also removed. The link 98 is disconnected as well as joints in the push rods 113 provided for this purpose but not indicated in detail in the drawings. It will be noted that the deflector member 77 is mounted on the frame of the conveyor 37 so as to be removed therewith as it is not needed unless the second conveyor and pile support are employed.

Although we have illustrated and described herein but a preferred form of the invention with a slight modification of one feature, it will be recognized that changes in the construction disclosed may be made without departing from the spirit of the invention or the scope of the appended claims.

We claim:

1. In a sheet-handling apparatus, a plurality of sheet-receiving supports disposed end to end, a plurality of conveyors arranged in tandem reciprocating above said supports toward and from a sheet-discharging device, deflecting means selectively causing a sheet to be delivered from the first conveyor to one of the supports or to a succeeding conveyor for delivery to another support and selectively operable means effective on reciprocation of said conveyors to change the setting of said means.

2. Sheet-handling apparatus comprising a frame reciprocable toward and from a sheet-discharging device, a plurality of conveyors arranged on said frame in tandem, deflecting means on said frame between said conveyors effective in one position to guide a sheet from one of said conveyors to the next and in another position to guide a sheet from said one of said conveyors onto a support therebelow and means effective to shift said deflecting means from one position to the other.

3. Sheet-handling apparatus comprising a frame reciprocable toward and from a sheet-discharging device, a plurality of conveyors arranged on said frame in tandem, deflecting means on said frame between said conveyors effective in one position to guide a sheet from one of said conveyors to the next and in another position to guide a sheet from said one of said conveyors onto a support therebelow and means adapted to be manually preset and effective on reciprocation of said conveyors to shift said deflecting means from one position to the other.

4. Sheet-handling apparatus comprising a pair of spaced side frames having ways extending therealong, a pair of conveyors disposed in tandem, reciprocable in said frames, each conveyor having side bars provided with shoes sliding in said ways and an endless conveyor belt trained around guide and drive pulleys, and a deflecting member pivoted to one of said conveyors effective in alternate positions to guide a sheet from the first conveyor to the second or to discharge it downwardly therefrom.

5. Sheet-handling apparatus including a pair of conveyors arranged in tandem and mounted for reciprocation, a deflector member between said conveyors, relatively fixed means for shifting said member on reciprocation of said conveyors, and means whereby said fixed means may be manually preset.

6. Sheet-handling apparatus comprising a pair of spaced side frames having ways extending therealong, a pair of conveyors disposed in tandem, reciprocable in said frames, each conveyor having side bars provided with shoes sliding in said ways and an endless conveyor belt trained around guide and drive pulleys, a deflecting member pivoted to one of said conveyors effective in alternate positions to guide a sheet from the first conveyor to the second or to discharge it downwardly therefrom and means for shifting said member comprising a side cam on one of said side frames and a lever rigid with said member having a follower adapted to engage said cam.

7. Sheet-handling apparatus comprising a frame reciprocable toward and from a sheet-discharging device, a plurality of conveyors arranged end to end on said frame, and deflecting means mounted at the adjacent ends of two of said conveyors and movable from a position in which it operates to guide a sheet from one of said conveyors to the next to another position in which it is effective to guide a sheet from said one of said conveyors onto a support therebelow.

8. Sheet-handling apparatus comprising a frame reciprocable toward and from a sheet-discharging device, a plurality of conveyors arranged end to end on said frame, and deflecting means mounted on said frame between said conveyors movable from a position in which it is effective to guide a sheet from one of said conveyors to the next to another position in which it is effective to guide a sheet from said one of said conveyors onto a support therebelow.

9. In a sheet-handling apparatus, a plurality of sheet receiving supports disposed side by side, a conveyor above one of said supports and mounted for reciprocation toward and from a sheet-discharging device, and movable deflecting means mounted adjacent the delivery end of the conveyor and selectively operable to divert a sheet downward from the conveyor to one of the supports or to direct a sheet across said means for delivery to another support.

10. In a sheet-handling apparatus, a plurality of sheet-receiving supports disposed side by side, a plurality of conveyors arranged end to end above said supports and mounted for reciprocation toward and from a sheet-discharging device, movable deflecting means mounted adjacent the delivery end of the first conveyor and selectively operable to cause a sheet to be delivered from the first conveyor to one of the supports or to a succeeding conveyor for delivery to another support, and selectively operable means effective to change the setting of said means.

11. In a sheet-handling mechanism, a pair of conveyor frames disposed end to end in tandem and mounted for reciprocation, means for moving said frames toward and from a sheet-discharging device, and a traveling deflector member disposed generally between said frames and mounted on one of them for movement from a position in which it directs a sheet from one conveyor frame onto the next to a position in which it directs a sheet downwardly onto a support.

12. Sheet-handling apparatus comprising a pair of spaced side frames having ways extending therealong, a pair of conveyors disposed in tandem, reciprocable in said frames, each conveyor having side bars provided with shoes sliding in said ways and an endless conveyor belt trained around guide and drive pulleys, a deflecting member pivoted to one of said conveyors effective in alternate positions to guide a sheet from the first conveyor to the second or to discharge it downwardly therefrom and relatively fixed but manually adjustable means effective on reciprocation of said conveyors to shift said deflecting member from one of its positions to another.

SAMUEL A. HUFFMAN.
JOSEPH SINKOVITZ.
AUGUST A. SAUL.